US009519793B2

(12) United States Patent
Kurian

(10) Patent No.: US 9,519,793 B2
(45) Date of Patent: Dec. 13, 2016

(54) SECURE DOCUMENT REPOSITORY

(71) Applicant: BANK OF AMERICA CORPORATION, Charlotte, NC (US)

(72) Inventor: Manu Jacob Kurian, St. Louis, MO (US)

(73) Assignee: Bank of America Corporation, Charlotte, NC (US)

( * ) Notice: Subject to any disclaimer, the term of this patent is extended or adjusted under 35 U.S.C. 154(b) by 254 days.

(21) Appl. No.: 14/339,313

(22) Filed: Jul. 23, 2014

(65) Prior Publication Data
US 2016/0026804 A1 Jan. 28, 2016

(51) Int. Cl.
*G06F 21/00* (2013.01)
*G06F 21/60* (2013.01)
*G06F 21/57* (2013.01)
*G06F 21/64* (2013.01)

(52) U.S. Cl.
CPC .......... *G06F 21/602* (2013.01); *G06F 21/57* (2013.01); *G06F 21/645* (2013.01); *G06F 2221/034* (2013.01)

(58) Field of Classification Search
CPC ... G06F 21/602; G06F 21/57; G06F 2221/034
See application file for complete search history.

(56) References Cited

U.S. PATENT DOCUMENTS

| 2001/0042046 | A1* | 11/2001 | Fukuda | H04L 63/0428 705/51 |
| 2002/0059227 | A1* | 5/2002 | Narahara | G06F 17/30011 |
| 2005/0094178 | A1* | 5/2005 | Anno | H04N 1/00244 358/1.13 |

* cited by examiner

*Primary Examiner* — Brandon Hoffman
*Assistant Examiner* — Thong Truong
(74) *Attorney, Agent, or Firm* — Michael A. Springs; Moore & Van Allen PLLC; Patrick B. Horne

(57) ABSTRACT

Embodiments for secure data storage that include systems and methods that receive, from a second system maintained by a second entity, a data payload to be stored by the system; secure the data payload at a first time; store the secured data payload; receive a request for access to the data payload; and provide certification, corresponding to a second time subsequent to the first time, that the data payload has not been altered since the first time.

12 Claims, 4 Drawing Sheets

SECURE DOCUMENT REPOSITORY

BACKGROUND

A data repository is a shareable collection of information supporting an organization's or enterprise's data and data processing functions. As organizations become more dependent on document management systems for business transactions, data sharing, and everyday communications, their data repositories have become increasingly accessible to users such as customers, employees, suppliers, partners, contractors and telecommuters. Unfortunately, as the accessibility increases, so does the exposure of critical data that is stored on the data repositories. Typical document repositories enable authorized access to data payloads stored in the repository giving the user full access to read, copy, and modify targeted data. There is a need for a system and method for providing secure data payload storage, whereby the system provides a certification for the security of stored data payloads.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatuses (e.g., a system, computer program product, and/or other device) and methods for a secure data storage. Accordingly, in one aspect, the present invention embraces a system maintained by a first entity for providing secure data payload storage, whereby the system provides certification of the security of stored data payloads. The system comprises a computer apparatus including a processor and a memory and a software module stored in the memory, comprising executable instructions executed by the processor. These instructions cause the processor to receive, from a second system maintained by a second entity, a data payload to be stored by the system; secure the data payload at a first time; store the secured data payload; receive a request for access to the data payload; and provide certification, corresponding to a second time subsequent to the first time, that the data payload has not been altered since the first time.

In some embodiments, the request is received from a third entity different from the first entity and the second entity, and wherein the certification comprises confirmation that the second entity has not accessed or altered the data payload since the first time.

In some embodiments, the data payload has been secured by a first encryption by the second system.

In some embodiments, securing the data payload comprises securing the data payload by a second encryption.

In some embodiments, securing the data payload further comprises providing access to the data payload to a third entity for securing the data payload by a third encryption.

In some embodiments, the computer instructions when executed further cause the processor to present an interface configured to provide access to the data payload for editing the data payload.

In some embodiments, the computer instructions when executed further cause the processor to provide access to the data payload, at a third time, for editing the data payload resulting in an edited data payload; and record the third time.

In some embodiments, the computer instructions when executed further cause the processor to storing a second version of the data payload based on the edited data payload.

In some embodiments, the data payload comprises at least one electronic document.

In one aspect, a computer program product for providing secure data access, the computer program product comprising a non-transitory computer readable storage medium having computer readable program code embodied therewith, the computer readable program code comprising computer readable program code configured to: receive, from a second system maintained by a second entity, a data payload to be stored by the system; secure the data payload at a first time; store the secured data payload; receive a request for access to the data payload; and provide certification, corresponding to a second time subsequent to the first time, that the data payload has not been altered since the first time.

In one aspect, a computer-implemented method for providing secure data access, the method comprising receiving, using a computing device processor, from a second system maintained by a second entity, a data payload to be stored by the system; securing, using a computing device processor, the data payload at a first time; storing, using a computing device processor, the secured data payload; receiving, using a computing device processor, a request for access to the data payload; and providing certification, using a computing device processor, corresponding to a second time subsequent to the first time, that the data payload has not been altered since the first time.

BRIEF DESCRIPTION OF THE SEVERAL VIEWS OF THE DRAWINGS

The present embodiments are further described in the detailed description which follows in reference to the noted plurality of drawings by way of non-limiting examples of the present embodiments in which like reference numerals represent similar parts throughout the several views of the drawings and wherein.

DETAILED DESCRIPTION

Figure 1A:
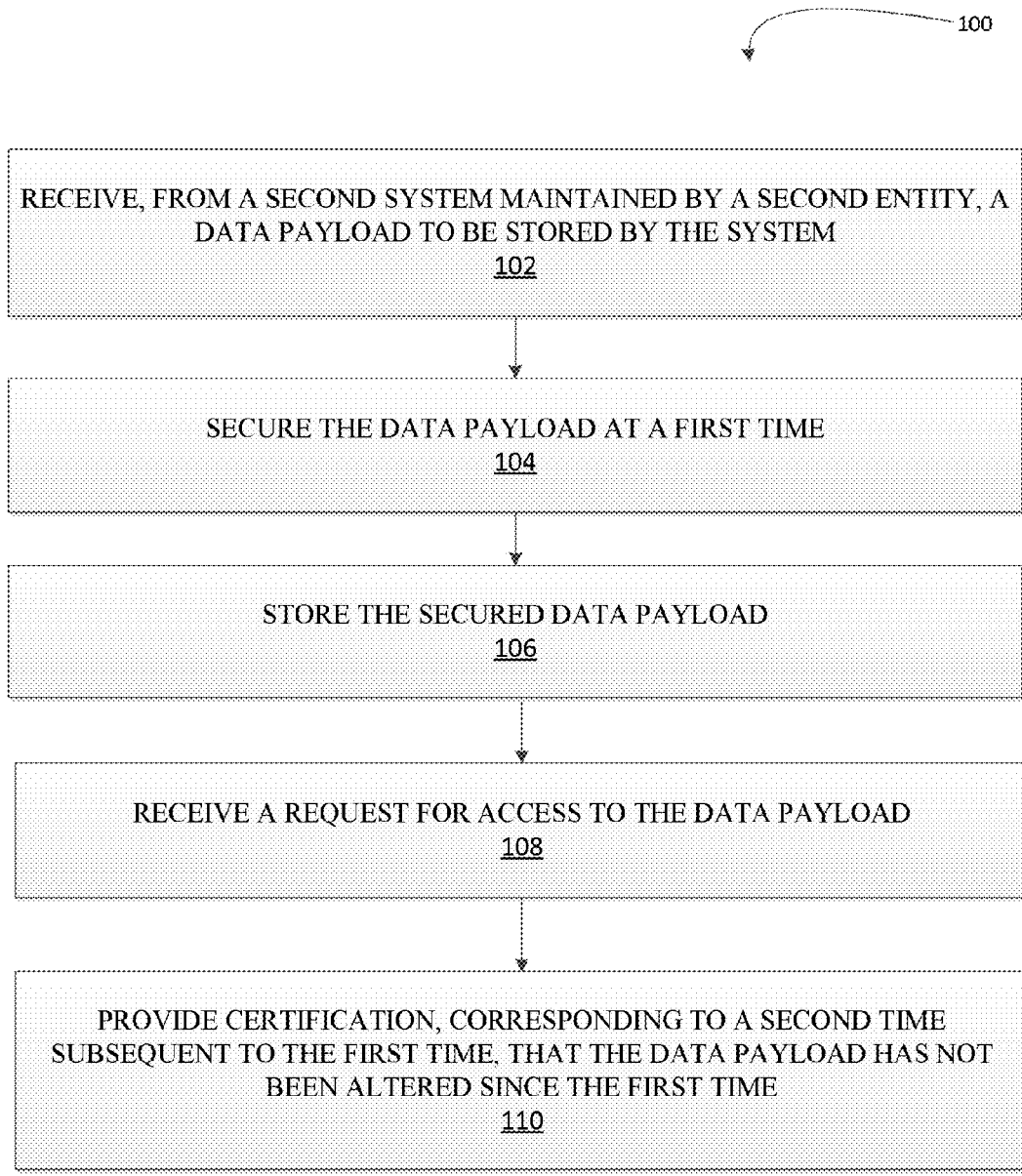
FIG. 1A illustrates a system maintained by a first entity for providing secure data payload storage, in accordance with some embodiments of this invention.

The embodiments presented herein are directed to systems, methods, and computer program products for providing secure data storage. Typically, document repositories enable authorized access to data payload stored in the repository giving the user full access to read, copy, and modify targeted data. Although the systems running these processes may keep data logs, with complete access, the integrity of the data payload initially stored in the document repository may be questionable when retrieved at a later date. As a result, these data payloads may not be eligible in a significant proceeding which requires data payload constancy. The present invention discloses systems and methods to enable a first entity to provide certification indicating data payload constancy from the time the data payload was initially stored in the memory store to the time the data payload was accessed by a third party.

The embodiments of the disclosure may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present embodiments of the disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present embodiments of the disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present embodiments of the disclosure are described below with reference to flowchart illustrations and/or block diagrams of methods, apparatus (systems) and computer program products according to embodiments of the embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Secure Data Storage

Referring now to the figures, in FIG. 1A, a system maintained by a first entity for providing secure data payload storage is provided in accordance with some embodiments of this disclosure. As shown in block 102, the system may be configured to receive, from a second system maintained by a second entity, a data payload to be stored by the system.

In some embodiments, a "first entity" as used herein may be a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the first entity may allow a user to establish an account with the first entity. An "account" may be the relationship that the user has with the first entity. Examples of accounts include a deposit account, such as a transactional account (e.g. a banking account), a savings account, an investment account, a money market account, a time deposit, a demand deposit, a pre-paid account, a credit account, a non-monetary user profile that includes only personal information associated with the user, or the like. The account is associated with and/or maintained by a first entity. In other embodiments, a "first entity" may not be a financial institution.

As used herein, data payload is a collection of data organized as part of a computer system. For example, a data payload may be a document, a spreadsheet, a presentation, a database, an audio or video file, a text file, a file specific to an application, or the like. One skilled in the art would understand that many different types of data payloads are possible and the examples disclosed herein are merely exemplary. The data payload typically has a single name or identifier under which the data may be accessed. In one aspect, the data payload may include a single document. In another aspect, the data payload may include two or more documents. In yet another aspect, the data payload may include multiple groups of two or more documents. While the phrase "data payload" may be used herein, the phrase "data payload" may be interchanged with the word "file" or "document" throughout this disclosure.

In some embodiments, the second entity may be a user, a program, an operating system, or the like. For example, a user may generate a report that is stored as a document. The user creates the data payload through use of a program. In some other embodiments, the data payload is automatically generated as part of a program. For example, a computer program may create a log of activities on a computer. In yet another embodiment, the data payload is a component of the operating system and or a program associated with the operating system. A printer driver may be an example of a file that is a component of an operating system.

In some embodiments, the data payload is received from a user, an external source, or a server on a network. For example, a user may be working with a file and decide to enter the file as a data payload into the system disclosed herein. The user may input the file, email the file, or otherwise indicate that the file is to be treated by the system disclosed herein. In some embodiments, the data payload is received from an external source. For example, a file may be sent to the financial institution via a USB drive or emailed to the institution. In some embodiments, the data payload is stored on a server connected to the system via a network, such as a wireless or wired network. For security purposes, in one aspect, the user may transmit the data payload for secure storage based on a successful verification of authentication credentials of the user. In some embodiments, the authentication credentials may be a password, pass phrase, a personal identification number (PIN), a wrist band, an identification card, a security token, or biometric identification such as a finger print, retinal pattern, voice recognition, or a facial recognition.

As shown in block 104, the system may then be configured to secure the data payload at a first time. In one aspect, securing the data payload includes encrypting the data payload. Typically, encryption is the process of encoding messages or information in such a way that only authorized persons with a corresponding encryption key may access the encrypted message or information. In some embodiments, the data payload may be subjected to one or more layers or encryption. For example, the data payload may initially be subjected to encryption by the second entity prior to transmitting the data payload for secure storage. The corresponding encryption key (first encryption key) will be in possession of the second entity. In response to receiving the data payload with a first layer of encryption, the system may subject the received data payload to a second layer of encryption. The corresponding encryption key (second encryption key) will be in possession of the system. In some embodiments, the system may enable the twice encrypted data payload to be subjected to a third level of encryption to increase the security level of the data payload. In one aspect, the third level of encryption may be performed by a third party security firm. The corresponding encryption key (third encryption key) will be in possession of the third party security firm. In some embodiments, each encryption level may be configured to reveal specific parts of the data payload. In this way, the system may take control away from the user so that the document may not be altered.

In some embodiments, the data payload may be a scanned version of the original document. In this regard, the scanned version of the data payload may be acceptable based on an attestation of the scanned data payload (e.g., by a notary) prior to a first layer of encryption.

In some other embodiments, each encryption level may be configured to determine a permitted action to the data payload. As used herein, a permitted action is a use of the data payload that is permitted by the system. For example, writing data to the data payload may be a permitted action. Editing data on a data payload, deleting data on a data payload, copying a data payload, sharing a data payload, establishing connections between the data payload and external sources, moving the data payload, viewing the data payload, and the like are all examples of actions that may be permitted actions. It should be understood that other actions, e.g., playing an audio data payload, may be permitted actions and that the list disclosed herein is merely exemplary. In some embodiments, the encrypted data payload may be accessed by a combination of two of more encryption keys. In one aspect, the system may be configured to initiate a presentation of a user interface to provide access to the data payload for editing the data payload. The user may then choose to save the edited data payload in the memory store. In such situations, the system may be configured to save a new version of the data payload in the memory store rather than storing over the original data payload, thereby maintaining the integrity of the original version of the data payload. In this regard, the system may be configured to record complete audit trails for each data payload showing a revision date, notes, content revised, or the like.

In some embodiments, the system may be configured to store one or more time instants associated with the data payload. For example, the system may record a first time when the data payload is initially secured to be stored in the memory space, a second time when the data payload is accessed and certified; and a third time when an edited version of the data payload is stored in the memory space, or the like. In general, the system may be configured to record every time instant the data payload has been accessed.

As shown in block 106, the system may then be configured to store the secured data payload. In some embodiments, the system may store the secured data payload in one or more memory stores associated with the first entity. As used herein, memory store may be a hardware or software embodiment of memory that stores the file. For example, the memory store may be a partition on a hard drive that stores the data payload. While the phrase "memory store" may be used herein, the phrase "memory store" may be interchanged with the word "repository" or the phrase "data repository" throughout this disclosure. The user may be accessing a folder in a directory structure of a computer in order to access the data payload. In one aspect, the memory store may be proprietary to the first entity. In another aspect, the memory store may be on a cloud hosted by a third party file hosting service.

As shown in block 108, the system may be configured to receive a request for access to the data payload. In one aspect, the request is received from a third entity different from the first entity and the second entity. In some embodiments, a "third entity" as used herein may be a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the third entity may allow a user to establish an account with the third entity. An "account" may be the relationship that the user has with the third entity. Examples of accounts include a deposit account, such as a transactional account (e.g. a banking account), a savings account, an investment account, a money market account, a time deposit, a demand deposit, a pre-paid account, a credit account, a non-monetary user profile that includes only personal information associated with the user, or the like. The account is associated with and/or maintained by a third entity. In other embodiments, a "third entity" may not be a financial institution.

In some embodiments, "accessing" means that some portion of the data payload is viewable by the user. For example, seeing the name of the data payload means that the data payload is being accessed. In this example, opening a folder or directory structure that includes the data payload is accessing the data payload. In some embodiments, "accessing" means that the user is attempting to open the data payload. For example, the user is opening the data payload to read the contents of a document. "Accessing" may also mean copying the data payload, editing the data payload, or the like. In some embodiments, the definition of "accessing" may be specified by a user when the permitted use is defined.

In response, the system may be configured to provide certification, corresponding to a second time subsequent to the first time, that the data payload has not been altered since the first time. In this way, the third party accessing the data payload can be confident that the integrity of the data payload is not compromised. In some embodiments, the third party may request one or more available versions of the data payload. In one aspect, the one or more available versions of the data payload may include an edit history. Typically, an edit history may include a list of one or more users associated with one or more edited versions of the secure data payload. In some embodiments, the system may be configured to enable transmission of the data payload by the third entity.

An exemplary embodiment of the present invention may be implemented in the process of anticipating and arranging for the disposal of an estate during a person's life. Typically, estate planning involves one or more documents such as the will, trusts, beneficiary designations, power of appointment, property ownership, and power of attorney. These documents of estate planning are usually generated by the owner prior to the owner's passing, in some cases, years before the owner's passing. In accordance with an embodiment of the invention, the owner may associate one or more individuals with one or more documents of the estate and secure the documents as a single data payload with the first entity. In this situation, the owner of the estate is the second entity from whom the data payload is received and the executor of the owner's estate is the third entity that may require access to the data payload. After the owner's passing, the executor of the owner's estate may gain access to the secure data payload containing the one or more documents generated by the owner and receive certification from the first entity that the data payload has not been modified or altered since the owner uploaded the documents into the system. In this way, the executor may be confident that there has been no foul play involved in the estate execution process.

Figure 1B:
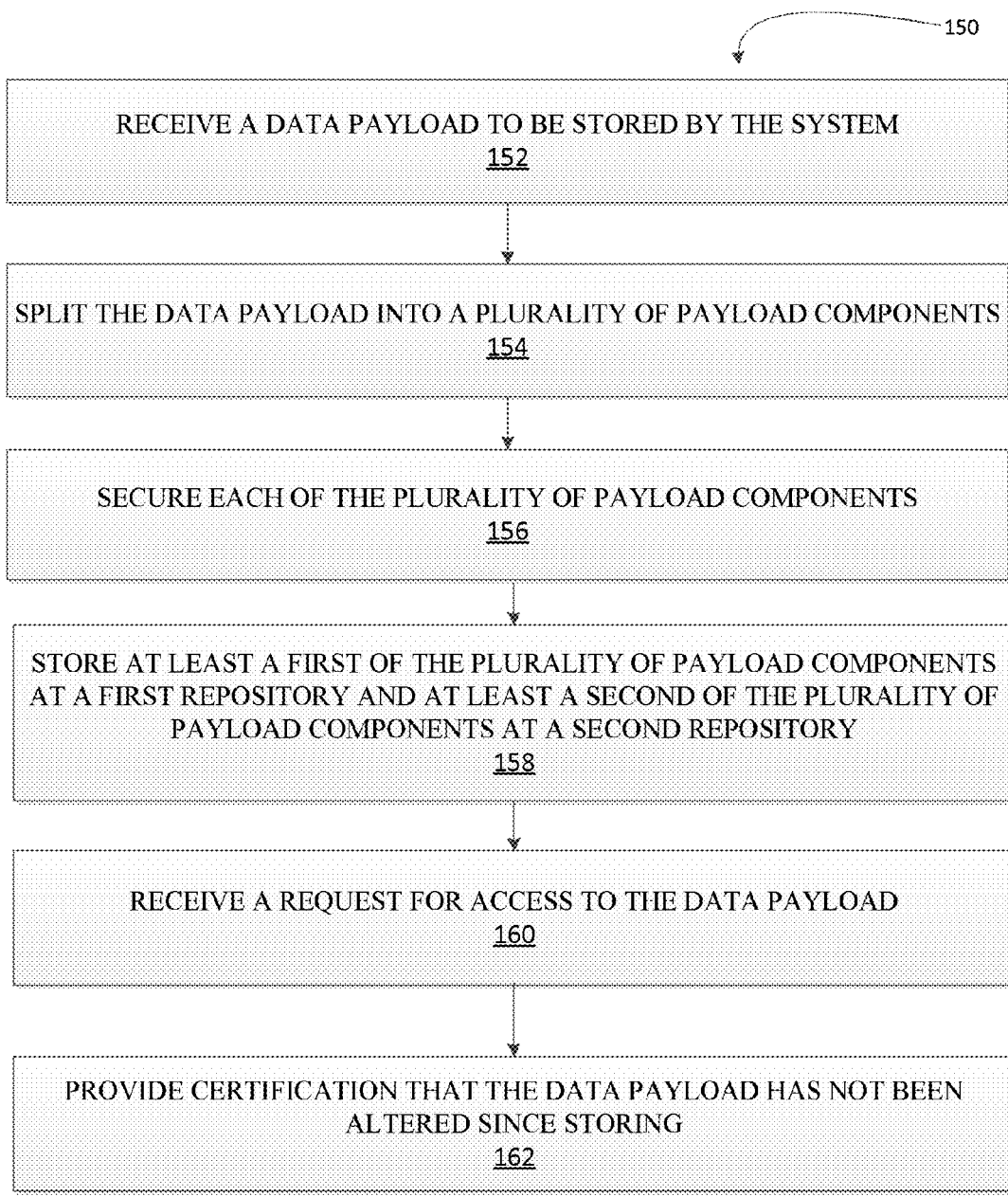
FIG. 1B illustrates a system maintained by a first entity for providing secure data payload storage split into a plurality of payload components, in accordance with some embodiments of this invention.

In FIG. 1B, a system maintained by a first entity for providing secure data payload storage split into a plurality of payload components is provided in accordance with some embodiments of this disclosure. Typically, data splitting is an approach to protecting sensitive data from unauthorized access by encrypting the data and storing different portions of a file on different memory stores. When split data is accessed, the parts are retrieved, combined, and decrypted. Data splitting can be made even more effective by periodically retrieving and combining the parts, and then splitting the data in a different way amount different memory stores, and using a different encryption key.

As shown in block 152, the system may be configured to receive a data payload to be stored by the system. In some embodiments, the system may be configured to generate a profile corresponding to the received data payload and store the generated profile in the memory store. In response, the system may be configured to split the data payload into a plurality of payload components, as shown in block 154. In some embodiments, the system may be configured to automatically split the data payload into a plurality of components based on preconfigured preferences. In some other embodiments, the system may be configured to enable the user to split the data payload into a plurality of components.

In response, the system may be configured to secure each of the plurality of payload components, as shown in block 156. In one aspect, each of the plurality of payload components may be encrypted using the same encryption scheme. In another aspect, each of the plurality of payload components may be encrypted using one or more different encryption schemes.

In response, the system may be configured to store at least a first of the plurality of payload components at a first repository and at least a second of the plurality of payload components at a second repository, as shown in block 158. In one aspect, the system may be configured to enable the user choose one or more repositories to store the plurality of payload components based on size, category, format, or the like. In one aspect, each payload component may be secured independently of the other payload components (e.g., split key, dual biometric identification, or the like). In this regard, the data payload may be accessed only when an authentication credential associated with each of the payload components associated with the data payload is received.

In some embodiments, the system may receive a request for access to the data payload, as shown in block 160. In one aspect, in response to receiving the request, the system may be configured to compile the plurality of payload components from the one or more repositories, resulting in a compiled payload. Once the payload components have been compiled, the system may then determine a profile for the compiled payload components. Typically, data profiling is the process of examining the data payload in an existing data repository and collecting statistics and information about the data payload. The advantages of data profiling include but is not limited to improving the ability to search the data payload by tagging it with keywords, descriptions or assigned category, determining whether the data payload conforms to particular standards or patterns, assessing the risk involved in integrating data payload for new applications, or the like. In response to compiling the payload components, the system may then confirm that the profile corresponding to the compiled payload matches the profile corresponding to the received data payload. In one aspect, the certification is based at least in part on the confirmation that the profiles match.

In response to receiving a request for access to the data payload, the system may be configured to provide certification that the data payload has not been altered since storing, as shown in block 162. In some embodiments, in response to receiving the request, the system may initiate communication of each of the plurality of payload components to a destination system and initiate compilation of the plurality of payload components by the destination system, resulting in a compiled payload. In some other embodiments, the system may be configured to receive a compilation communication from the destination system comprising a profile corresponding to the compiled payload. In response, the system may confirm that the received profile corresponding to the compiled payload matches the profile corresponding to the received data payload. In one aspect, the certification is based at least in part on the confirmation that the profiles match. In yet another embodiment, the system may be configured to transmit the profile corresponding to the data payload to the destination system and provide certification that the data payload has been altered since being stored in the memory store based on at least comparing the profile of the received data payload to the profile of the compiled payload components.

Environment for Providing a Secure Data Repository

Figure 2A:
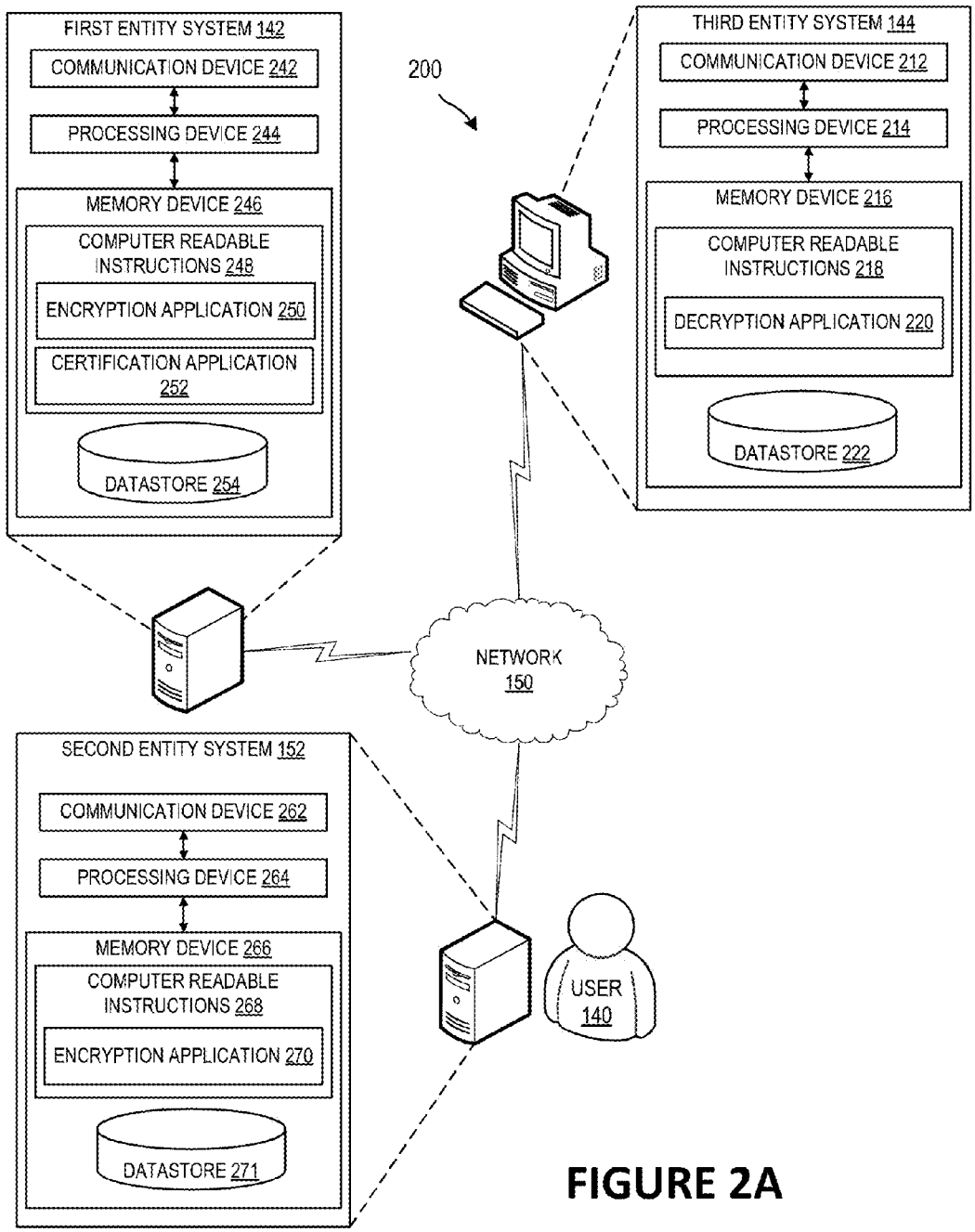
FIG. 2A illustrates an environment for providing a secure data repository in accordance with an embodiment of the present invention.
Figure 2B:
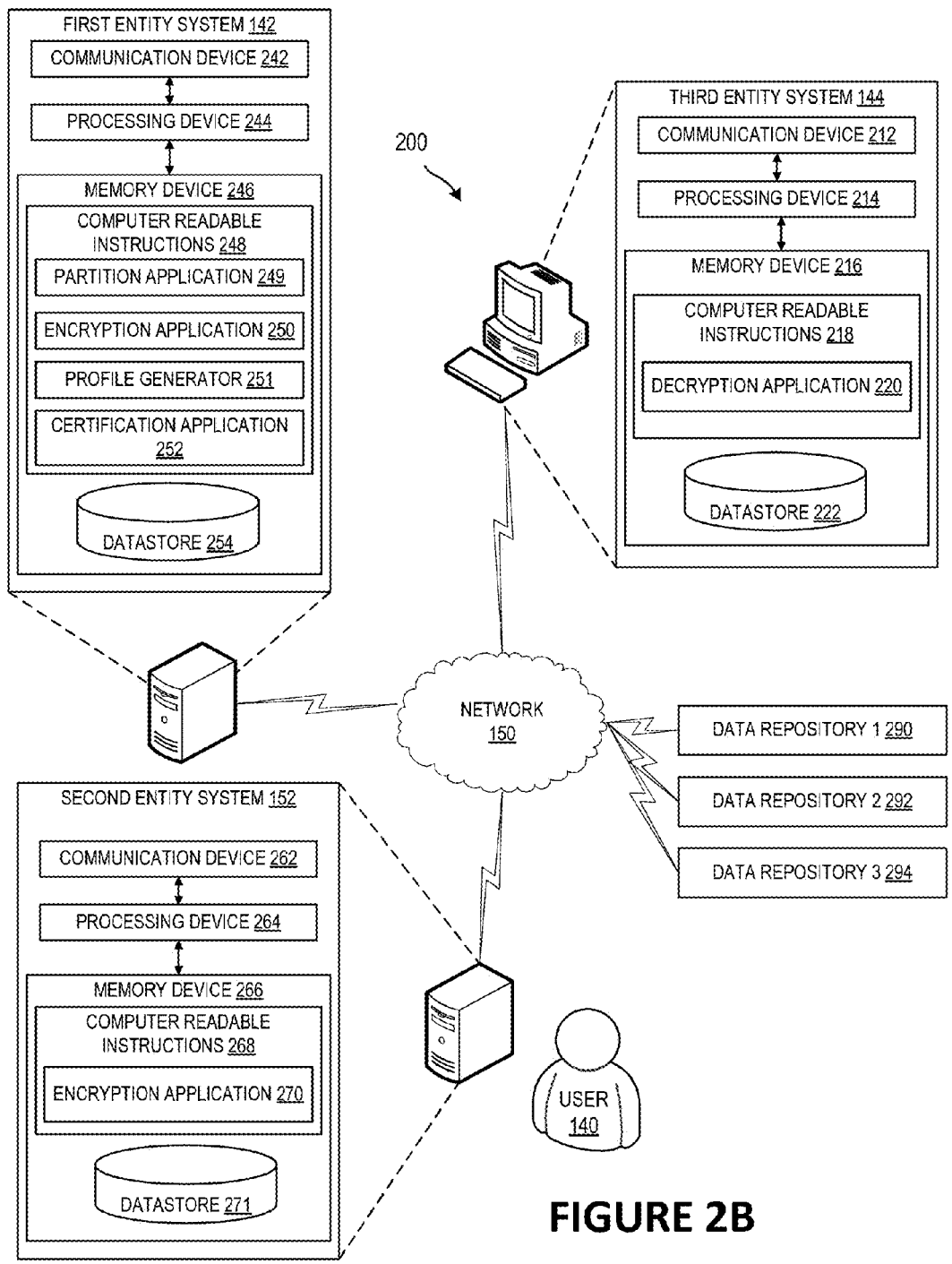
FIG. 2B illustrates an environment for splitting the data payload into a plurality of payload components and storing the plurality of data components in one or more data repositories in accordance with an embodiment of the present invention.

Referring now to FIGS. 2A and 2B, a block diagram illustrates an environment 200 for providing a secure data repository. The environment 200 includes a third entity system 144, a first entity system 142, and a second entity system or device 152. The user 140 is associated with the second entity system 152 and can include an owner of the device 152, parties that have authorized access to the device 152, an employee, associate, and the like. The second entity system 152 can include any type of device such as an ATM, a computing device, a mobile device, and so forth. The third entity system 144 and first entity system 152 can include a system associated with a financial institution, a third party, or a vendor. The systems and devices communicate with one another over the network 150 and perform one or more of the various steps and/or methods according to embodiments of the disclosure discussed herein.

The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet.

The third entity system 144, the second entity system 152, and the first entity system 142 each include a computer system, server, multiple computer systems and/or servers or the like. The second entity system 152 includes a communication device 262 communicably coupled with a processing device 264, which is also communicably coupled with a memory device 266. The processing device 264 is configured to control the communication device 262 such that the second entity system 152 communicates across the network 150 with one or more other systems. The processing device 264 is also configured to access the memory device 266 in order to read the computer readable instructions 268, which in some embodiments include encryption application 270 for performing various tasks such as data payload compression, encryption, and/or other forms of data payload manipulation. In one aspect, the encryption application 270 may be configured to generate an encryption key to be stored in the memory device 266 that can be used to access the data payload. The memory device 266 also includes a datastore 271 or database for storing pieces of data that can be accessed by the processing device 264. In some embodiments, the communication device 262 may be configured to transmit the encrypted data payload to the first entity system 142 to be securely stored.

The first entity system 142, in the embodiments shown has a communication device 242 communicably coupled with a processing device 244, which is also communicably coupled with a memory device 246. The processing device 244 is configured to control the communication device 242 such that the first entity system 142 communicates across the network 150 with one or more other systems. The processing device 244 is also configured to access the memory device 246 in order to read the computer readable instructions 248, which in some embodiments includes encryption application 250 and certification application 252. The encryption application 250 may be configured to encrypt a data payload received from the second entity system 152 and generate an encryption key to be stored in the memory device 246 that can be used to access the data payload. The certification application 252 may provide certification that the data payload received from the second entity system 152 has not been altered since being stored in the data store 254. The memory device 246 also includes a datastore 254 or database for storing pieces of data that can be accessed by the processing device 244, such as for storing encrypted data payloads. In one aspect, the memory device 246 may record a first time, a time when the data payload is initially stored in the datastore 254.

In some embodiments, the system environment may include means to enable the user with access to the data payload to retrieve the data payload from the data store 254 to edit, alter, or modify the contents. In addition, the system may include means to enable the user to save the modified contents of the data payload in the data store 254 as a version of the originally stored data payload. In one aspect, the system environment may initiate the presentation of a user interface to enable user access to the data payload. In some embodiments, enabling user access to the data payload may require verification of one or more authentication credentials associated with the user. In this regard, the system may be configured to present a false set of documents to a user based on at least determining that the user is attempting to access the data payload without proper verification ("intruder") of one or more authentication credentials. For example, the system may present a false set of documents to an intruder based on a predetermined number of false attempts to access the data payload.

The third entity system 144 includes a communication device 212 and communicably coupled with a processing device 214, which is also communicably coupled with a memory device 216. The processing device 214 is configured to control the communication device 212 such that the third entity system 144 communicates across the network 150 with one or more other systems. The processing device 214 is also configured to access the memory device 216 in order to read the computer readable instructions 218, which in some embodiments includes a decryption application 220 for running specific programs. The memory device 216 also includes a datastore 222 or database for storing pieces of data that can be accessed by the processing device 214. In one aspect, the third entity system 144 may be configured to transmit a request to the first entity system 142 to receive an encrypted data payload. The decryption application 220 may be configured to decrypt the data payload previously encrypted by the encryption application 250.

As used herein, a "processing device," generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 214, 244, or 264 may further include functionality to operate one or more software programs based on computer-executable program code thereof, which may be stored in a memory. As the phrase is used herein, a processing device 214, 244, or 264 may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "memory device" generally refers to a device or combination of devices that store one or more forms of computer-readable media and/or computer-executable program code/instructions. Computer-readable media is defined in greater detail below. For example, in one embodiment, the memory device 246 includes any computer memory that provides an actual or virtual space to temporarily or permanently store data and/or commands provided to the processing device 244 when it carries out its functions described herein.

The applications 220, 250, 252, and 270 are for instructing the processing devices 214, 244 and 264 to perform various steps of the methods discussed herein, and/or other steps and/or similar steps. In various embodiments, one or more of the applications 220, 250, 252, and 270 are included in the computer readable instructions stored in a memory device of one or more systems or devices other than the systems 152 and 142 and the third entity system 144. In various embodiments, the applications 220, 250, 252, and 270 stored and executed by different systems/devices are different. In some embodiments, the applications 220, 250, 252, and 270 stored and executed by different systems may be similar and may be configured to communicate with one another, and in some embodiments, the applications 220, 250, 252, and 270 may be considered to be working together as a singular application despite being stored and executed on different systems.

In various embodiments, one of the systems discussed above, such as the first entity system 142, is more than one system and the various components of the system are not collocated, and in various embodiments, there are multiple components performing the functions indicated herein as a single device. For example, in one embodiment, multiple processing devices perform the functions of the processing device 244 of the first entity system 142 described herein. For example, the first entity system 142 may include a financial institution system, an information technology system, and the like.

In various embodiments, the first entity system 142, the second entity system 152, and the third entity system 144 and/or other systems may perform all or part of a one or more method steps discussed above and/or other method steps in association with the method steps discussed herein. Furthermore, some or all the systems/devices discussed here, in association with other systems or without association with other systems, in association with steps being performed manually or without steps being performed manually, may perform one or more of the methods discussed below, or other methods, processes or steps discussed herein or not discussed herein.

FIG. 2B illustrates a system environment for splitting the data payload into a plurality of payload components and storing the plurality of data components in one or more data repositories. The memory device 246 of the first entity system 142 includes a partition application 249. The partition application 249 may be configured to split the data payload into a plurality of payload components to be stored in a plurality of data repositories 290, 292, and 294. In one aspect, the first entity system 142 includes a profile generator 251 configured to generate a data profile for a data payload transmitted to the first entity system 142 to be stored securely. In one aspect, the profile generator 251 may be configured to generate a payload component profile for each of the one or more payload components generated by the partition application 250. Each of the payload components may be stored in the data repositories 290, 292, and/or 294 along with the generated payload component profiles. In one aspect, the data profiles generated may be used to certify the integrity of the data payload by the certification application 252 of the first entity system 142.

The flowcharts and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or teams thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to embodiments of the disclosure in the form disclosed. Many modifications and variations will be apparent to those of ordinary skill in the art without departing from the scope and spirit of embodiments of the disclosure. The embodiment was chosen and described in order to best explain the principles of embodiments of the disclosure and the practical application, and to enable others of ordinary skill in the art to understand embodiments of the disclosure for various embodiments with various modifications as are suited to the particular use contemplated. Although specific embodiments have been illustrated and described herein, those of ordinary skill in the art appreciate that any arrangement which is calculated to achieve the same purpose may be substituted for the specific embodiments shown and that embodiments of the disclosure have other applications in other environments. This application is intended to cover any adaptations or variations of the present disclosure. The following claims are in no way intended to limit the scope of embodiments of the disclosure to the specific embodiments described herein.

What is claimed is:

1. A system for providing secure data payload storage, whereby the system provides certification of the security of stored data payloads, the system comprising:
 a first computer apparatus maintained by a first entity and including a processor and a memory; and a software module stored in the memory, comprising executable instructions that when executed by the processor cause the processor to secure a data payload by a first encryption, thereby resulting in a first secured data payload; and to transmit the first secured data payload to a second computer apparatus; and
 a second computer apparatus maintained by a second entity and operatively coupled with the first computer apparatus and including a processor and a memory; and a software module stored in the memory, comprising executable instructions that when executed by the processor cause the processor to:
  receive, from the first computer apparatus, the first secured data payload to be stored by the second apparatus;
  secure the first secured data payload at a first time by securing the first secured data payload by a second encryption, thereby resulting in a second secured data payload;
  store the second secured data payload;
  provide access to the second secured data payload to a third party for encryption by a third encryption, thereby resulting in a third secured data payload;
  store the third secured data payload;
  receive a request for access to the data payload;
  provide access to the third secured data payload to the third party for decryption by the third encryption, thereby resulting in the second secured data payload;
  decrypt the second secured data payload;
  transmit the second secured data payload to the first computer apparatus for decryption of the second secured data payload by the first encryption, thereby resulting in a decrypted data payload;
  provide certification, corresponding to a second time subsequent to the first time, that the data payload has not been altered since the first time; and
  provide access to the decrypted data payload to the requester.

2. The system of claim 1, wherein the request is received from a third entity different from the first entity and the second entity, and wherein the certification comprises confirmation that the second entity has not accessed or altered the data payload since the first time.

3. The system of claim 1, wherein the computer instructions when executed further cause the processor to:
 present an interface configured to provide access to the data payload for editing the data payload.

4. The system of claim 3, wherein the computer instructions when executed further cause the processor to:
 provide access to the data payload, at a third time, for editing the data payload resulting in an edited data payload; and
 record the third time.

5. The system of claim 3, wherein the computer instructions when executed further cause the processor to:
 storing a second version of the data payload based on the edited data payload.

6. The system of claim 1, wherein the data payload comprises at least one electronic document.

7. A computer program product for providing secure data access, the computer program product comprising:
 a non-transitory computer readable storage medium having computer readable program code embodied therewith, the computer readable program code comprising:
 first computer readable program code configured to cause a first computer apparatus, when executed, to secure a data payload by a first encryption, thereby resulting in a first secured data payload; and to transmit the first secured data payload to a second computer apparatus;
 second computer readable program code configured to cause a second computer apparatus, when executed, to:
  receive, from the first computer apparatus, the first secured data payload to be stored by the second apparatus;
  secure the first secured data payload at a first time by securing the first secured data payload by a second encryption, thereby resulting in a second secured data payload;
  store the second secured data payload;
  provide access to the second secured data payload to a third party for encryption by a third encryption, thereby resulting in a third secured data payload;
  store the third secured data payload;
  receive a request for access to the data payload;
  provide access to the third secured data payload to the third party for decryption by the third encryption, thereby resulting in the second secured data payload;
  decrypt the second secured data payload;
  transmit the second secured data payload to the first computer apparatus for decryption of the second secured data payload by the first encryption, thereby resulting in a decrypted data payload;
  provide certification, corresponding to a second time subsequent to the first time, that the data payload has not been altered since the first time; and
  provide access to the decrypted data payload to the requester.

8. The computer program product of claim 7, wherein the request is received from a third entity different from the first entity and the second entity, and wherein the certification comprises confirmation that the second entity has not accessed or altered the data payload since the first time.

9. The computer program product of claim 7, wherein the computer readable program code is further configured to:
  present an interface configured to provide access to the data payload for editing the data payload.

10. The computer program product of claim 9, wherein the computer readable program code is further configured to:
  provide access to the data payload, at a third time, for editing the data payload resulting in an edited data payload; and
  record the third time.

11. A computer-implemented method for providing secure data access, the method comprising:
  securing, by a first computing device processor, a data payload by a first encryption, thereby resulting in a first secured data payload;
  transmitting, by the first computing device processor, the first secured data payload to a second computing device processor of a second computer apparatus;
  receiving, using a second computing device processor, the first secured data payload to be stored by the second apparatus;
  securing, using the second computing device processor, the first secured data payload at a first time by securing the first secured data payload by a second encryption, thereby resulting in a second secured data payload;
  storing, using the second computing device processor, the second secured data payload;
  providing, using the second computing device processor, access to the second secured data payload to a third party for encryption by a third encryption, thereby resulting in a third secured data payload;
  storing, using the second computing device processor, the third secured data payload;
  receiving, using the second computing device processor, a request for access to the data payload;
  providing, using the second computing device processor, access to the third secured data payload to the third party for decryption by the third encryption, thereby resulting in the second secured data payload;
  decrypting, using the second computing device processor, the second secured data payload;
  transmitting, using the second computing device processor, the second secured data payload to the first computer apparatus for decryption of the second secured data payload by the first encryption, thereby resulting in a decrypted data payload;
  providing certification, using the second computing device processor, corresponding to a second time subsequent to the first time, that the data payload has not been altered since the first time; and
  providing, using the second computing device processor, access to the decrypted data payload to the requester.

12. The method of claim 11, wherein the request is received from a third entity different from the first entity and the second entity, and wherein the certification comprises confirmation that the second entity has not accessed or altered the data payload since the first time.

\* \* \* \* \*